United States Patent Office 3,133,424
Patented May 19, 1964

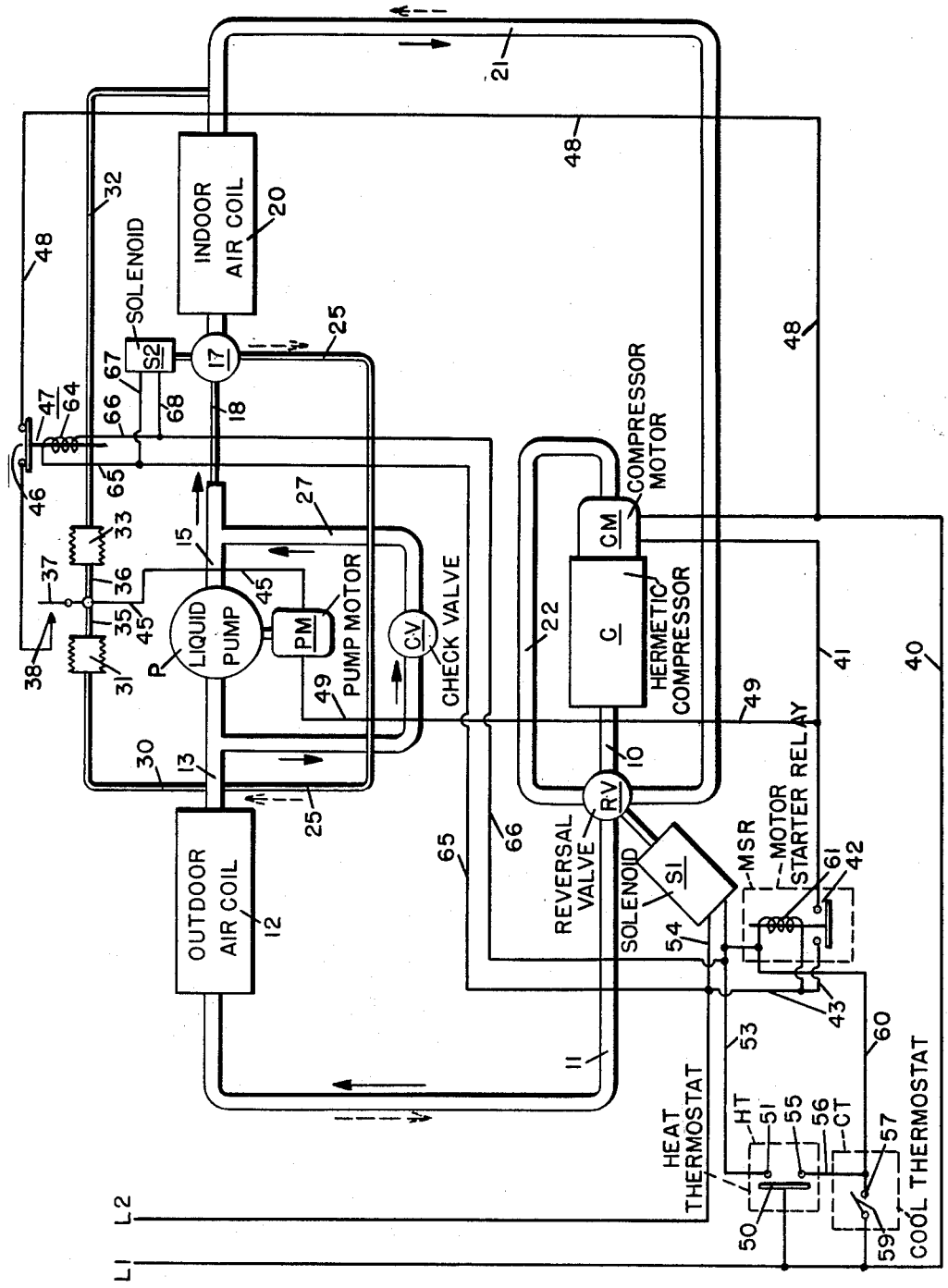

3,133,424
CONTROLS FOR HEAT PUMPS HAVING AIR EXPOSED OUTDOOR AIR COILS
Robert T. Palmer, Sharon, Mass., assignor to Westinghouse Electric Corporation, East Pittsburgh, Pa., a corporation of Pennsylvania
Filed Nov. 29, 1962, Ser. No. 240,811
6 Claims. (Cl. 62—160)

This invention relates to controls for heat pumps having air-cooled, outdoor air coils.

Heat pumps that are used for cooling or heating indoor air usually consist of motor driven refrigerant compressors that are connected through solenoid adjusted, refrigerant reversal valves to indoor air coils and to outdoor air coils. When indoor air cooling is required, a reversal valve is adjusted to route refrigerant from a compressor through an outdoor air coil acting as a condenser coil, and then through refrigerant expansion means into an indoor air coil acting as an evaporator coil. When indoor air heating is required, the reversal valve is adjusted to route refrigerant from the compressor through the indoor air coil acting as a condenser coil, and then through expansion means into an outdoor air coil acting as an evaporator coil.

Due to the lack of sufficient water in many locations to water cool the outdoor coils of heat pumps when such outdoor coils are operating as condenser coils, and due to the cost of water cooling such coils when sufficient water is available, air-exposed, outdoor air coils are widely used. In many heat pump systems for buildings containing delicate equipment such as computers, it is the practice to operate heat pumps for indoor air cooling during such low outdoor temperatures that the refrigerant pressure from the outdoor coils acting as condenser coils, may be insufficient to properly operate the expansion devices connected between the outdoor and indoor air coils. An automatically controlled liquid pump can be placed in the liquid line between the outdoor air coil and the expansion device of such a heat pump when it is operating to cool indoor air, for boosting the liquid pressure, when required, at low outdoor air temperatures. But the outdoor temperature may decrease further to the point that the indoor air may have to be heated by the heat pump. The necessity for the liquid pump no longer exists when the heat pump operates to heat the indoor air since the indoor air coil would be operating as a condenser coil, but the liquid pump and its controls would prevent the operation of the heat pump in indoor air heating.

An object of this invention is to maintain desired liquid pressures at the expansion means of a heat pump when the latter is operating to cool indoor air without affecting the operation of the heat pump in heating indoor air.

This invention will now be described with reference to the annexed drawing which is a diagrammatic view of a heat pump system embodying this invention.

A hermetic refrigerant compressor C, driven by an electric motor CM, has its discharge side connected through a tube 10 to a four-way, refrigerant reversal valve which may be of the type disclosed in the U.S. Patent No. 2,672,734. The valve RV is adjustable by a solenoid S1 to indoor air cooling or to indoor air heating positions. The valve RV is connected by a tube 11 to one end of an outdoor air coil 12, the other end of which is connected by a tube 13 to the inlet of a liquid pump P which is driven by an electric motor PM. The outlet of the pump P is connected by tube 15, three-way valve 17 and capillary tube 18 to one end of an indoor air coil 20, the other end of which is connected by a tube 21 to the reversal valve RV. The valve RV is connected by a tube 22 to the interior of the casing of the motor CM, which interior is connected to the suction side of the compressor C as is usual in hermetic compressors. The valve 17 is connected by a capillary tube 25 to the tube 13, and is adjustable by a solenoid S2 to a position where it routes refrigerant from the tube 15 into the tube 18 or to a position where it routes refrigerant from the coil 20 into the tube 25.

A tube 27 containing a check-valve CV is connected to the tubes 13 and 15 as a by-pass around the pump P when the latter is not operating.

A capillary tube 30 connects the tube 13 to a pressure bellows 31. A capillary tube 32 may be used to connect the tube 21 to a suction bellows 33. The bellows 30 is connected by linkage 35 to a pivoted switch arm 37, and the bellows 33, if used, is connected by linkage 36 to the switch arm 37. The switch arm 37 is opposite a contact 38. The bellows 31 responds to refrigerant pressure at the outlet of the outdoor air coil when the latter is operating as a condenser coil, and when such pressure is reduced by a reduction in outdoor air temperature to a pressure insufficient to properly operate the capillary tube 18 as an expansion means, the switch arm 37 moves against the contact 38 closing a circuit that will be described later. The suction bellows 33 may be used with the pressure bellows 31 in a more sensitive, differential control.

The capillary tubes 18 and 25 serve as refrigerant expansion means as disclosed in the G. L. Biehn Patent No. 2,785,540, and the tube 25 may have the greater length so as to add additional restriction as does the check-valve restrictor of this patent during indoor air heating operation when the tube 25 is the expansion means.

The compressor motor CM is connected by a wire 40 to electric supply line L1, and is connected by a wire 41, switch 42 of a motor starter relay MSR, and a wire 43 to electric supply line L2. The pump motor PM is connected through a wire 45, the switch arm 37, the contact 38, switch 46 of relay 47 and wire 48 to one side of the motor CM, and through wires 49 and 41 to the other side of the motor CM so that the pump motor PM operates when the compressor motor operates provided the switch arm 37 is against the contact 38, and the switch 46 is closed.

A heat thermostat HT has a switch arm 50 connected to the supply line L1, and has a contact 51 connected by wire 53 to the solenoid S1 which is connected by wire 54 to the supply line L2. The thermostat HT has another contact 55 connected by wire 56 to contact 57 of cool thermostat CT. The thermostat CT has a switch arm 59 connected to the supply line L1. Its contact 57 is connected by wire 60 to one end of energizing coil 61 of the relay MSR, the other end of which is connected by the wire 43 to the supply line L2. The relay MSR is energized and closes its switch 42 to energize the compressor motor CM when either of the switch arms 50 or 59 of the thermostats HT or CT respectively, touch the contacts 55 or 57 respectively. The solenoid S1 is energized when the switch arm 50 of the thermostat HT touches the contact 51 at the same time it touches the contact 55.

The relay 47 has an energizing coil 64 connected by wires 65, 66, 67 and 68 across the solenoid S1. The solenoid S2 is connected by the same wires across the solenoid S1. Thus, when the solenoid S1 is energized by the thermostat HT, the relay 47 and the solenoid S2 are energized.

During the operation of the heat pump in indoor air cooling, the solenoid S1 is deenergized, and the valve RV is in position to route refrigerant from the compressor C first to the outdoor air coil 12 and then to the indoor air coil 20 as shown by the solid line arrows on the drawing. At this time the relay 47 is deenergized and its switch 46 is closed. At this time the solenoid S2 is deenergized, and the valve 17 is in position to route refrigerant through the capillary tube 18 into the indoor air coil 20, and to close off the capillary tube 25.

During the operation of the heat pump in indoor air heating, the solenoid S1 is energized and places the valve RV in position to route refrigerant from the compressor C first to the indoor air coil 20 and then to the outdoor air coil 12 as shown by the dashed line arrows on the drawing. At this time the relay 47 is energized and its switch 46 is open. At this time the solenoid S2 is energized and places the valve 17 in position to route refrigerant from the indoor air coil 20 into the capillary tube 25, and to close off the capillary tube 18.

*Operation*

Assume that the cool thermostat CT has called for indoor air cooling so that its switch arm 59 is against its contact 57, energizing the relay MSR and through the latter the compressor motor CM. The pump motor PM normally would not be energized due to the condensing pressure normally being sufficient to operate the capillary tube 18 as an expansion means so that the switch arm 37 of the pressure bellows 31 is spaced from the contact 38 in the energizing circuit of the pump motor. The check valve CV is open, and the by-pass around the pump P is open. Refrigerant flows from the compressor through the outdoor air coil 12, the tube 27 and check-valve CV, the tube 15, the capillary tube 18 serving as an expansion device, the valve 17, the indoor air coil 20 and the tube 21 back to the compressor. The outdoor air coil 12 operates as a condenser coil.

The refrigerant pressure within a condenser coil decreases with decreases in the temperature of the coil so that at low outdoor temperatures, the pressure within the coil 12 may be insufficient to expand the refrigerant through the capillary tube 18 into the indoor air coil 20. When this happens, the pressure within the bellows 31 decreases, causing the switch arm 37 to move against the contact 38, connecting the pump motor through the closed switch 46 and the wires 45, 49, 41 and 48 across the energized compressor motor CM, starting the pump P which boosts the liquid pressure. The pressure from the pump through the tube 27 closes the check valve CV. When the thermostat CT is satisfied, it stops the compressor motor CM and the pump motor PM.

If the outdoor temperature decreases to the point that indoor air heating is required, the switch arm 50 of the heat thermostat HT moves against the contacts 51 and 55, closing through the contact 55, the energizing circuit of the motor starter relay MSR, and closing through the contact 51, the energizing circuits of the solenoids S1 and S2, and of the relay 47. The solenoid S1 adjusts the valve RV to its indoor air heating position. The solenoid S2 adjusts the valve 17 to close off the capillary tube 18, and to route refrigerant from the indoor air coil 20 acting as a condenser coil, through the capillary tube 25 acting as an expansion means, into the outdoor coil 12 acting as an evaporator coil. The pressure within the coil 12 at this time is much lower than when the latter is operating as a condenser coil so that the switch arm 37 of the bellows 31 is against the contact 38, but the pump motor cannot be started at this time since the now energized relay 47 has opened its switch 46 which is in series with the switch arm 37 and the contact 38 in the energizing circuit of the pump motor.

What is claimed, is:

1. A heat pump comprising an indoor air coil, an outdoor air coil, a refrigerant compressor, a refrigerant reversal valve connected to the suction and discharge sides of said compressor and to said coils, means including a liquid pump, a three-way valve and first refrigerant expansion means in series for connecting said outdoor air coil to said indoor air coil, by-pass tubing including a check-valve connected across said pump, means for driving said pump, means including second refrigerant expansion means for connecting said three-way valve to said outdoor air coil, means for adjusting said three-way valve to route refrigerant from said outdoor air coil through said first expansion means into said indoor air coil and for concurrently adjusting said reversal valve to route refrigerant from said compressor directly into said outdoor air coil, or for adjusting said three-way valve to route refrigerant from said indoor air coil through said second expansion means into said outdoor air coil and for concurrently adjusting said reversal valve to route refrigerant from said compressor directly into said indoor air coil, and control means including means responsive to a predetermined drop in refrigerant pressure caused by a reduction in the temperature of said outdoor air coil when said reversal valve is adjusted to route refrigerant from said compressor directly to said outdoor air coil, for energizing said pump driving means.

2. A heat pump comprising an indoor air coil, an outdoor air coil, a refrigerant compressor, a refrigerant reversal valve connected to the suction and discharge sides of said compressor and to said coils, means including a liquid pump, a three-way valve and first refrigerant expansion means in series for connecting said outdoor air coil to said indoor air coil, by-pass tubing including a check-valve connected across said pump, means for driving said pump, means including second refrigerant expansion means for connecting said three-way valve to said outdoor air coil, means for adjusting said three-way valve to route refrigerant from said outdoor air coil through said first expansion means into said indoor air coil and for concurrently adjusting said reversal valve to route refrigerant from said compressor directly into said outdoor air coil, or for adjusting said three-way valve to route refrigerant from said indoor air coil through said second expansion means into said outdoor air coil and for concurrently adjusting said reversal valve to route refrigerant from said compressor directly into said indoor air coil, control means including means responsive to a predetermined drop in refrigerant pressure caused by a reduction in the temperature of said outdoor air coil when said reversal valve is adjusted to route refrigerant from said compressor directly to said outdoor air coil, for energizing said pump driving means, and means for disabling said control means when said reversal valve is adjusted to route refrigerant from said compressor directly to said indoor air coil.

3. A heat pump comprising an indoor air coil, an outdoor air coil, a refrigerant compressor, a refrigerant reversal valve connected to the suction and discharge sides of said compressor and to said coils, means including a liquid pump and first refrigerant expansion means in series for connecting said outdoor air coil to said indoor air coil, by-pass tubing including a check-valve connected across said pump, means for driving said pump, means including second refrigerant expansion means for connecting said indoor air coil to said outdoor air coil, means for adjusting said reversal valve to route refrigerant from said compressor directly to said outdoor air coil, or to route refrigerant from said compressor directly to said indoor air coil, control means responsive to a predetermined drop in refrigerant pressure caused by a reduction in the temperature of said outdoor air coil when said reversal valve is adjusted to route refrigerant from said compressor directly to said outdoor air coil for energizing said pump driving means, and means for disabling said control means when said reversal valve is adjusted to route refrigerant from said compressor directly to said indoor coil.

4. A heat pump comprising an indoor air coil, an outdoor air coil, a refrigerant compressor, a refrigerant reversal valve connected to the suction and discharge sides of said compressor and to said coils, means including a liquid pump and first refrigerant expansion means for connecting said outdoor air coil to said indoor air coil, by-pass tubing including a check-valve connected across said pump, means for driving said pump, means including second refrigerant expansion means for connecting said indoor air coil to said outdoor air coil, means for routing refrigerant from said outdoor air coil through said first expansion means into said indoor air coil and for concurrently adjusting said reversal valve to route refrigerant from said compressor directly to said outdoor air coil, or for routing refrigerant from said indoor air coil through said second expansion means into said outdoor air coil and for concurrently adjusting said reversal valve to route refrigerant from said compressor directly to said indoor air coil, control means responsive to a predetermined drop in refrigerant pressure caused by a reduction in the temperature of said outdoor air coil when said reversal valve is adjusted to route refrigerant from said compressor directly to said outdoor air coil, for energizing said pump driving means, and means for disabling said control means when said reversal valve is adjusted to route refrigerant from said compressor directly to said indoor air coil.

5. A heat pump comprising an indoor air coil, an outdoor air coil, a refrigerant compressor, a refrigerant reversal valve connected to the suction and discharge sides of said compressor and to said coils, means including a liquid pump and first refrigerant expansion means in series for connecting said indoor coil to said outdoor coil, by-pass tubing including a check-valve connected across said pump, means for driving said pump, means including second expansion means for connecting said indoor coil to said outdoor coil, means for routing refrigerant from said outdoor air coil through said first expansion means into said indoor air coil or for routing refrigerant from said indoor air coil through said second expansion means into said outdoor air coil, a solenoid for adjusting said routing means, a second solenoid for adjusting said reversal valve to route refrigerant from said compressor directly from said compressor into said outdoor air coil or directly from said compressor into said indoor air coil, means including thermostatic means for energizing said solenoids, and control means responsive to a predetermined drop in refrigerant pressure caused by a reduction in the temperature of said outdoor air coil when said reversal valve is adjusted to route refrigerant directly from said compressor to said outdoor air coil, for energizing said pump driving means.

6. A heat pump comprising an indoor air coil, an outdoor air coil, a refrigerant compressor, a refrigerant reversal valve connected to the suction and discharge sides of said compressor and to said coils, means including a liquid pump and first refrigerant expansion means in series for connecting said indoor air coil to said outdoor air coil, by-pass tubing including a check-valve connected across said pump, means for driving said pump, means including second expansion means for connecting said indoor air coil to said outdoor air coil, means for routing refrigerant from said outdoor air coil through said first expansion means into said indoor air coil or for routing refrigerant from said indoor air coil through said second expansion means into said outdoor air coil, a solenoid for adjusting said routing means, a second solenoid for adjusting said reversal valve to route refrigerant from said compressor directly into said outdoor air coil or directly into said indoor air coil, means including thermostatic means for energizing said solenoids, control means responsive to a predetermined drop in refrigerant pressure caused by a reduction in the temperature of said outdoor coil, and means for disabling said driving means when said reversal valve is adjusted to route refrigerant from said compressor directly to said indoor air coil.

References Cited in the file of this patent
UNITED STATES PATENTS

| | | |
|---|---|---|
| 2,949,750 | Kramer | Aug. 23, 1960 |
| 3,060,698 | Felter | Oct. 30, 1962 |